United States Patent
Jeong et al.

(10) Patent No.: US 7,387,419 B2
(45) Date of Patent: Jun. 17, 2008

(54) BACKLIGHT OF LIQUID CRYSTAL DISPLAY DEVICE

(75) Inventors: In Suk Jeong, Seoul (KR); Myong Gi Jang, Seoul (KR)

(73) Assignee: LG. Philips LCD. Co., Ltd, Seoul (KR)

( * ) Notice: Subject to any disclaimer, the term of this patent is extended or adjusted under 35 U.S.C. 154(b) by 197 days.

(21) Appl. No.: 11/013,552

(22) Filed: Dec. 16, 2004

(65) Prior Publication Data

US 2005/0134760 A1 Jun. 23, 2005

(30) Foreign Application Priority Data

Dec. 17, 2003 (KR) ............ 10-2003-0092700

(51) Int. Cl.
*A47F 3/00* (2006.01)

(52) U.S. Cl. ............ 362/561; 362/614; 362/630; 362/631; 362/659; 362/288; 349/58; 349/60; 349/70

(58) Field of Classification Search ............ 362/561, 362/630, 631, 29, 30, 646, 652, 656, 659, 362/288, 634, 614, 217, 218, 219; 349/58, 349/60, 70

See application file for complete search history.

(56) References Cited

U.S. PATENT DOCUMENTS

| 5,006,179 | A | * | 4/1991 | Gaddy | ............ 136/244 |
| 6,869,197 | B2 | * | 3/2005 | Nishigaki | ............ 362/615 |
| 7,090,376 | B2 | * | 8/2006 | Kang et al. | ............ 362/225 |
| 7,172,330 | B2 | * | 2/2007 | Lee et al. | ............ 362/634 |
| 2004/0156183 | A1 | * | 8/2004 | Kim | ............ 362/31 |
| 2005/0073049 | A1 | * | 4/2005 | Tsubosaki | ............ 257/738 |

* cited by examiner

*Primary Examiner*—Ali Alavi
*Assistant Examiner*—Evan Dzierzynski
(74) *Attorney, Agent, or Firm*—Brinks Hofer Gilson & Lione

(57) ABSTRACT

A backlight of a liquid crystal display device includes lamps and a conductive board. Each lamp has electrodes, one of which is contacted and retained by a contact terminal on the conductive board. The contact terminals are electrically connected by the conductive board. A bent part located in the conductive board is disposed between adjacent contact terminals such that when heat from the lamps absorbed by the conductive board expands the conductive board, the bent part is resiliently deformed to maintain the distance between the lamps.

35 Claims, 7 Drawing Sheets

BACKLIGHT OF LIQUID CRYSTAL DISPLAY DEVICE

This application claims the benefit of Korean Patent Application No. P2003-92700 filed in Korea on Dec. 17, 2003, which is hereby incorporated by reference.

BACKGROUND

1. Field

The present invention relates to a liquid crystal display device, and more particularly to a backlight of a liquid crystal display device that is adaptive for preventing picture quality deterioration.

2. Description of the Related Art

Generally, a liquid crystal display LCD controls the light transmissivity of liquid crystal cells in accordance with a video signal to display a picture corresponding to the video signal on a liquid crystal display panel where the liquid crystal cells are arranged in a matrix shape.

For this, the liquid crystal display device includes a liquid crystal display panel where liquid crystal cells are arranged in an active matrix shape; and a backlight unit in the rear surface or the side surface of the liquid crystal display panel to illuminate light onto the liquid crystal display panel.

The backlight is divided into an edge type and a direct lighting type in the way of arranging cylindrical fluorescent lamps.

Firstly, in the edge light type, the fluorescent lamps are installed at the outer area to disperse light to the whole surface by use of a light guide panel. The brightness of the edge light type is low because the fluorescent lamp is installed at the side surface and light passes through the light guide panel. Further, complicated optical design technology and process technology on the light guide panel is required for uniform distribution of light.

The direct light type is comparatively brighter and more uniform than the edge light type because multiple fluorescent lamps are arranged on a plane.

In the direct light type, the fluorescent lamp as a light source is mainly a cold cathode fluorescent lamp CCFL that has electrodes inside both the ends thereof. Recently, however, an external electrode fluorescent lamp (EEFL) has been developed. The EEFL has electrodes at the surface of both ends thereof.

The EEFL has no direct collision between electrodes and ions, thus heat generation in the electrode is restrained. In the EEFL, the generation of plasma joule heat is low because the EEFL is driven at high voltage and low current. In addition, self-discharge exists in the EEFL, thus it can be driven with high brightness and high efficiency.

FIGS. 1 and 2 are a perspective view and a plan view representing a prior art backlight unit of a liquid crystal display device using an external electrode fluorescent lamp.

A backlight using an external electrode fluorescent lamp shown in FIGS. 1 and 2 includes a supporter having a first supporter 50 and a second supporter 52 where a lower contact terminal 56 holds both electrode parts 42a, 42b of the external electrode fluorescent lamp 40. Herein, the supporter having the first supporter 50 and the second supporter 52 has a rectangular stick shape and is separated from each other with a designated distance therebetween. The supporter having the first supporter 50 and the second supporter 52 is formed of thermal plastic elastomer TPE and polybutylene terephthalates PBT.

A lower conductive board 54, where a conductive nickel is coated over the original surface of phosphor bronze, beryllium copper, etc., is fixed by a screw 58 and the lower conductive board 54 is cut and bent to form a lower contact terminal 56 in the upper surface of the first supporter 50 and the second supporter 52, wherein the lower contact terminal 56 can hold, and at the same time cover the electrode parts 42a, 42b of the fluorescent lamp 40.

Herein, the first supporter 50, the second supporter 52 and the lower conductive board 54 can be bonded together by glue, heat melt-adhesion, insert injection, etc.

And, there is a cover having a first cover 60 and a second cover 62 that covers the upper part of both the electrode parts 42a, 42b of the external electrode fluorescent lamp 40 with the upper contact terminal 66 on the supporter inclusive of the first supporter 50 and the second supporter 52.

Herein, the first cover 60 and the second cover 62 have a rectangular stick shape and are separated from each other with a designated distance therebetween to correspond to the first supporter 50 and the second supporter 52, respectively.

The first cover 60 and the second cover 62 are made of thermal plastic elastomer TPE and polybutylene terephthalates PBT.

And, an upper conductive board 64, where a conductive nickel is coated over the original surface of phosphor bronze, beryllium copper, etc., is fixed by a screw 68 and the upper conductive board 64 is cut and bent to form an upper contact terminal 66 in the lower surface of the first cover 60 and the second cover 62, wherein the upper contact terminal 66 can hold, and at the same time cover the electrode parts 42a, 42b of the fluorescent lamp 40 that is located at the lower contact terminal 56 of the supporter.

Herein, the first cover 60, the second cover 62 and the upper conductive panel 64 can be bonded together by glue, heat melt-adhesion, insert injection, etc.

Accordingly, an operator holds the external electrode fluorescent lamp 40 to locate the electrode parts 42a, 42b of the external electrode fluorescent lamp 40 at the lower contact terminal 56 which is formed on the supporter having the first supporter 50 and the second supporter 52 that are separated from each other with a designated distance therebetween.

And then, the operator locates the cover having the first cover 60 and the second cover 62 on the supporter having the first supporter 50 and the second supporter 52 that hold the electrode parts 42a, 42b of the external electrode fluorescent lamp 40, at the lower contact terminal 56.

After then, the upper contact terminal 66 of the cover having the first cover 60 and the second cover 62 wraps to hold the upper part of the electrode parts 42a, 42b of the fluorescent lamp and covers the electrode parts 42a, 42b of the external electrode fluorescent lamp 40 that are held by the lower contact terminal 56.

In the prior art backlight unit using the external electrode fluorescent lamp 40, the upper and lower conductive boards 54, 64 are deformed by the heat conducted to the external electrode fluorescent lamp 40. This generates defects in the backlight.

More specifically, if an AC power is supplied to the external electrode fluorescent lamp 40 through the upper and lower contact terminal 54, 64, the external electrode fluorescent lamp 40 is driven. If the external electrode fluorescent lamp 40 is driven in this way, the heat conducted from the external electrode fluorescent lamp 40 causes the upper and lower conductive boards 54, 64, where the conductive nickel is coated on the original surface of the phosphor bronze, beryllium copper, etc., to be extended by thermal expansion. Herein, the extended upper and lower conductive boards 54, 64, as shown in FIG. 3, are separated from the supporter 50, 52 or the cover 60, 62, or expanded in a parallel direction to the supporter 50, 52 or the cover 60, 62, thereby causing the location of the lamp 40 to be changed. This causes the picture quality of the liquid crystal display panel to deteriorate due to the non-uniform light. Thus, the distance between the lamps 40 becomes non-uniform or the extended upper and lower conductive boards 54, 64 are separated from the supporter 50, 52 and the cover 60, 62.

SUMMARY

By way of introduction only, a backlight according to an aspect of the present invention includes a plurality of lamps, a plurality of contact terminals, and a conductive board electrically connecting the contact terminals. Each lamp has an electrode. Each contact terminal contacts one of the electrodes. The conductive board has a resilient bent part disposed therein.

A backlight according to another aspect of the present invention includes a plurality of lamps, a plurality of contact terminals, and a conductive board electrically connecting the contact terminals. Each lamp has an electrode. Each contact terminal contacts one of the electrodes. At least one elastic buffer part absorbs heat expansion of the conductive board.

A backlight according to another aspect of the present invention includes a plurality of lamps, a plurality of contact terminals, a conductive board electrically connecting the contact terminals and means for maintaining a distance between adjacent lamps with increasing heat from the lamps absorbed by the conductive board.

A method according to another aspect of the present invention includes inserting a plurality of lamps into contact terminals electrically connected by a conductive board such that electrodes of the lamps contact the contact terminals; supplying power to the lamps to turn on the lamps and display an image on a screen of a portable display device; and maintaining a distance between adjacent lamps independent of heat from the lamps absorbed by the conductive board by deforming a non-planar region of the conductive board.

It is to be understood that both the foregoing general description and the following detailed description of the present invention are exemplary and explanatory and are intended to provide further explanation of the invention as claimed.

BRIEF DESCRIPTION OF THE DRAWINGS

The following detailed description of the embodiments of the present invention refer to the accompanying drawings, in which.

DETAILED DESCRIPTION

Reference will now be made in detail to the preferred embodiments of the present invention, examples of which are illustrated in the accompanying drawings.

Hereinafter, embodiments of the present invention will be described in detail with reference to FIGS. 4 to 6.

A liquid crystal display device according to one embodiment of the present invention includes a liquid crystal display panel where liquid crystal cells are arranged in an active matrix shape; and a backlight unit to illuminate light onto the liquid crystal display panel.

The liquid crystal display panel includes an upper array substrate where a black matrix, a color filter and so on are sequentially formed on an upper substrate; a lower array substrate where a TFT, a pixel electrode and so on are formed on a lower substrate; and a liquid crystal injected into an inner space between the upper array substrate and the lower array substrate.

The backlight is an external electrode fluorescent lamp EEFL having electrodes on the surface of both ends in the direct lighting type backlight where a plurality of lamps are arranged in the rear surface of the liquid crystal display panel.

Figure 1:
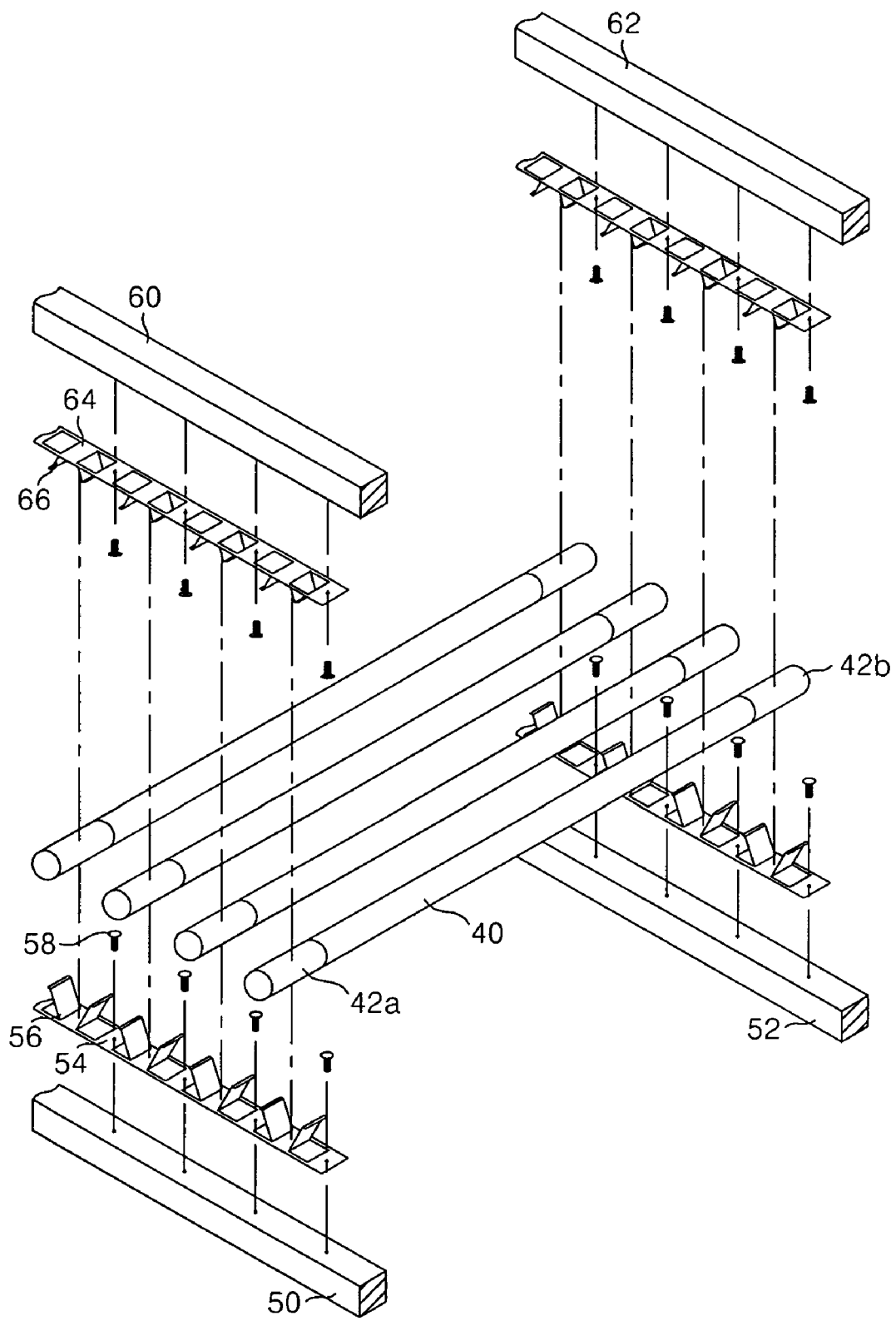
FIG. 1 is a plan view representing a prior art backlight unit using an external electrode fluorescent lamp.
Figure 2:
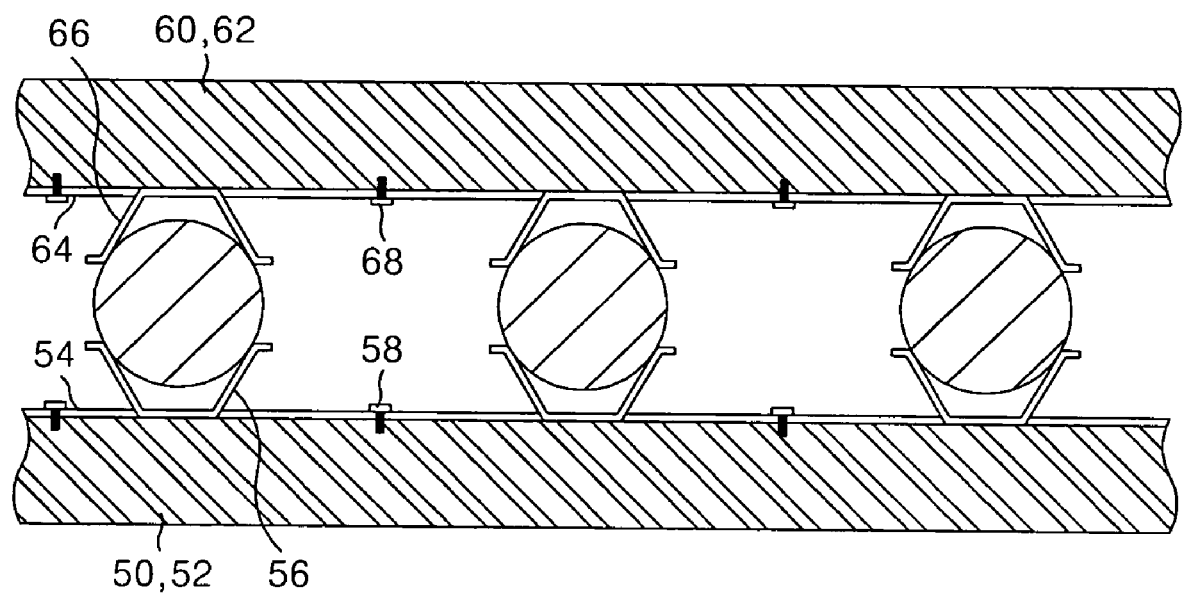
FIG. 2 is a sectional view representing the backlight unit using the external electrode fluorescent lamp of FIG. 1.
Figure 3:
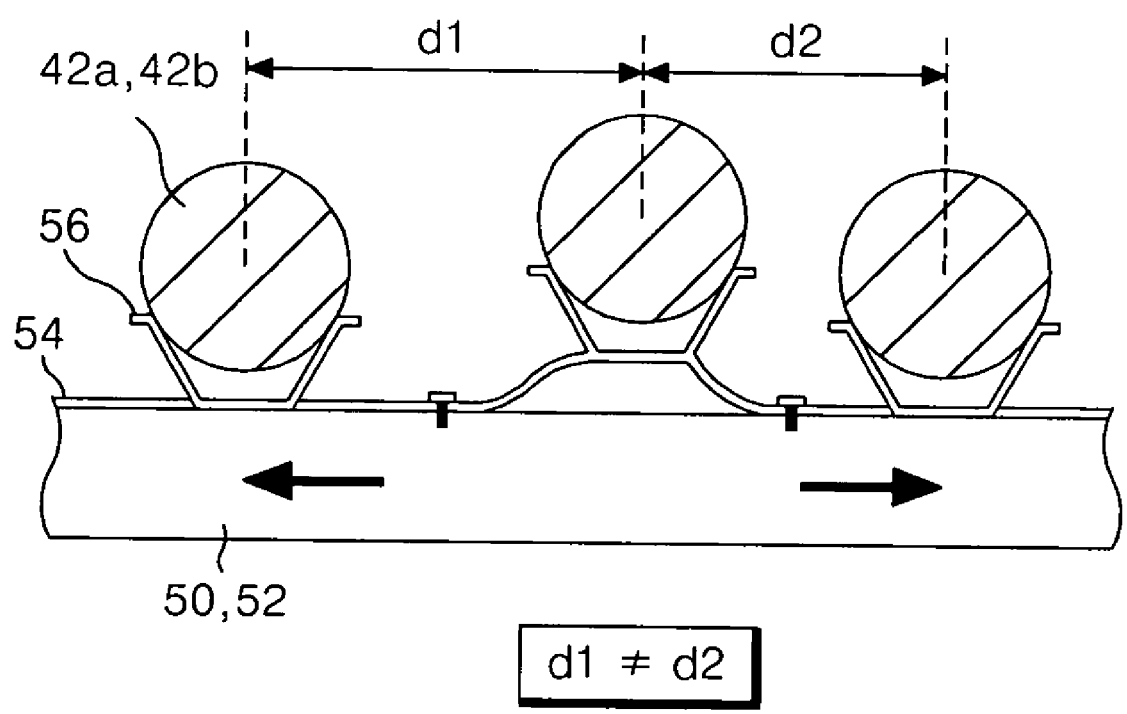
FIG. 3 is a diagram representing deformation of a conductive board that supplies power to an external electrode fluorescent lamp of FIGS. 1 and 2.
Figure 4:
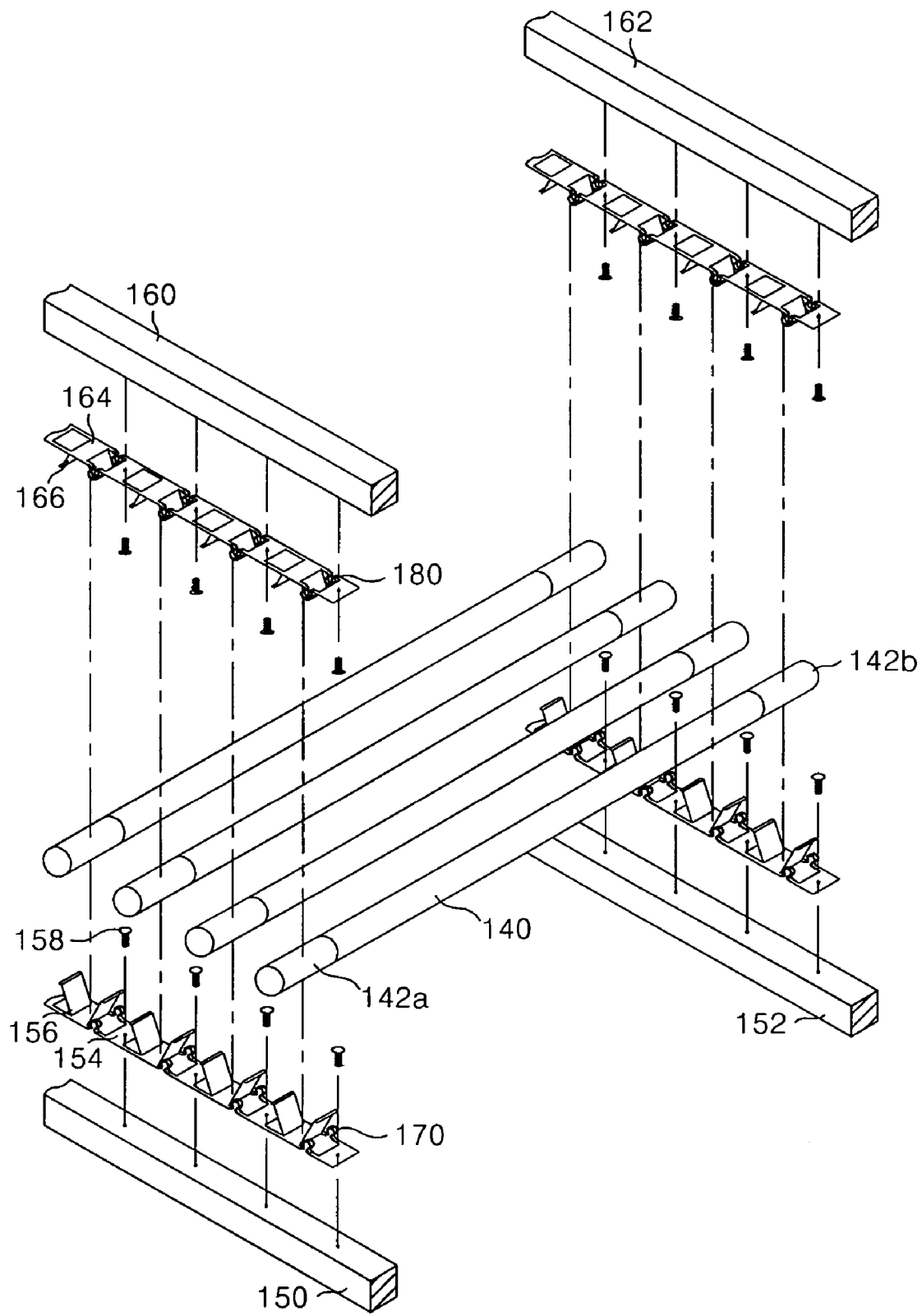
FIG. 4 is a plan view representing a backlight unit using an external electrode fluorescent lamp according to an embodiment of the present invention.
Figure 5:
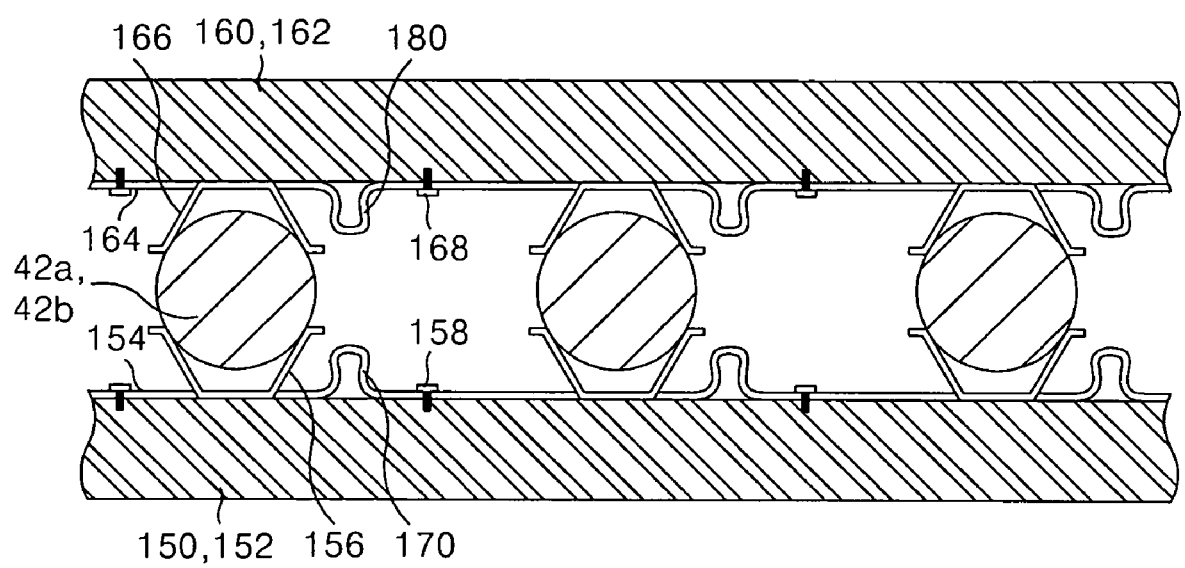
FIG. 5 is a sectional view representing the backlight unit using the external electrode fluorescent lamp of FIG. 4.

FIGS. 4 and 5 are a perspective view and a sectional view representing a backlight of a liquid crystal display device using an external electrode fluorescent lamp according to an embodiment of the present invention.

A backlight using an external electrode fluorescent lamp shown in FIGS. 4 and 5 includes a supporter having a first supporter 150 and a second supporter 152 that hold both electrode parts 142a, 142b of the external electrode fluorescent lamp to a lower contact terminal 156. Herein, the supporter having the first supporter 150 and the second supporter 152 have a rectangular stick shape and are separated from each other with a designated distance therebetween. The supporter having the first supporter 150 and the second supporter 152 is formed of a material of thermal plastic elastomer TPE, polybutylene terephthalates PBT, etc.

A lower conductive board 154, where a conductive nickel is coated over the original surface of phosphor bronze, beryllium copper, etc., is fixed by a screw 158 and the lower conductive board 154 is cut and bent to form a lower contact terminal 156 in the upper surface of the first supporter 150 and the second supporter 152, wherein the lower contact terminal 156 can hold, and at the same time cover the electrode parts 142a, 142b of the fluorescent lamp 140.

Further, the lower conductive board 154 includes a lower bent part 170 projected from the lower conductive board 154 as well as being located between the lower contact terminals 156, more specifically, between the lower contact terminal 166 and the screw 168. The lower bent part 170 is resilient, and thus able to absorb and relax expansion of the lower due to heat conducted from the fluorescent lamp 140. This permits the lower bent part 170 to lessen the deformity of the conductive board 154.

The first supporter 150, the second supporter 152 and the lower conductive board 154 can be bonded together by glue, heat melt-adhesion, insert injection or other means.

A cover having a first cover 160 and a second cover 162 covers the upper part of both the electrode parts 142a, 142b of the external electrode fluorescent lamp 140 with the upper contact terminal 166 on the supporter inclusive of the first supporter 150 and the second supporter 152.

The first cover 160 and the second cover 162 have a rectangular stick shape and are separated from each other with a designated distance therebetween to correspond to the first supporter 150 and the second supporter 152, respectively. The first cover 160 and the second cover 162 are made of thermal plastic elastomer TPE and polybutylene terephthalates PBT.

An upper conductive board 164, where a conductive nickel is coated over the original surface of phosphor bronze, beryllium copper, etc., is fixed by a screw 168 and the upper conductive board 164 is cut and bent to form an upper contact terminal 166 in the lower surface of the first cover 160 and the second cover 162, wherein the upper contact terminal 166 can hold, and at the same time cover the electrode parts 142a, 142b of the fluorescent lamp 140 that is located at the lower contact terminal 156 of the supporter. The first cover 160 and the second cover 162 can be bonded by a guide alternatively or in addition to the screw 158, 168.

Further, the upper conductive board 164 includes an upper bent part 180 projected from the upper conductive board 164 as well as being located between the upper contact terminals 166, more specifically, between the upper contact terminal 166 and the screw 168. The upper bent part 180 is resilient, and thus able to absorb and relax expansion of the lower due to heat conducted from the fluorescent lamp 140. This permits the upper bent part 180 to lessen the deformity of the conductive board 164.

The first supporter 160, the second supporter 162 and the upper conductive board 164 can be bonded together by glue, heat melt-adhesion, insert injection, etc.

Accordingly, an operator holds the external electrode fluorescent lamp 140 to locate the electrode parts 142a, 142b of the external electrode fluorescent lamp 140 at the lower contact terminal 156 which is formed on the supporter having the first supporter 150 and the second supporter 152 that are separated from each other with a designated distance therebetween.

And then, the operator locates the cover having the first cover 160 and the second cover 162 on the supporter having the first supporter 150 and the second supporter 152 that hold the electrode parts 142a, 142b of the external electrode fluorescent lamp 140, at the lower contact terminal 156.

Subsequently, the upper contact terminal 166 of the cover having the first cover 160 and the second cover 162 wraps to hold the upper part of the electrode parts 142a, 142b of the fluorescent lamp 140 and covers the electrode parts 142a, 142b of the external electrode fluorescent lamp 140 that are held by the lower contact terminal 156.

In this way, the backlight unit of the liquid crystal display device according to one embodiment of the present invention includes resilient upper and lower bent parts 180, 170 located between the upper and lower contact terminals 166, 156 and projecting from the upper and lower conductive boards 154, 164. The bent parts 180, 170 prevent the conductive panels 154, 164 from being deformed by the heat applied to the conductive boards 154, 164.

Figure 6A:
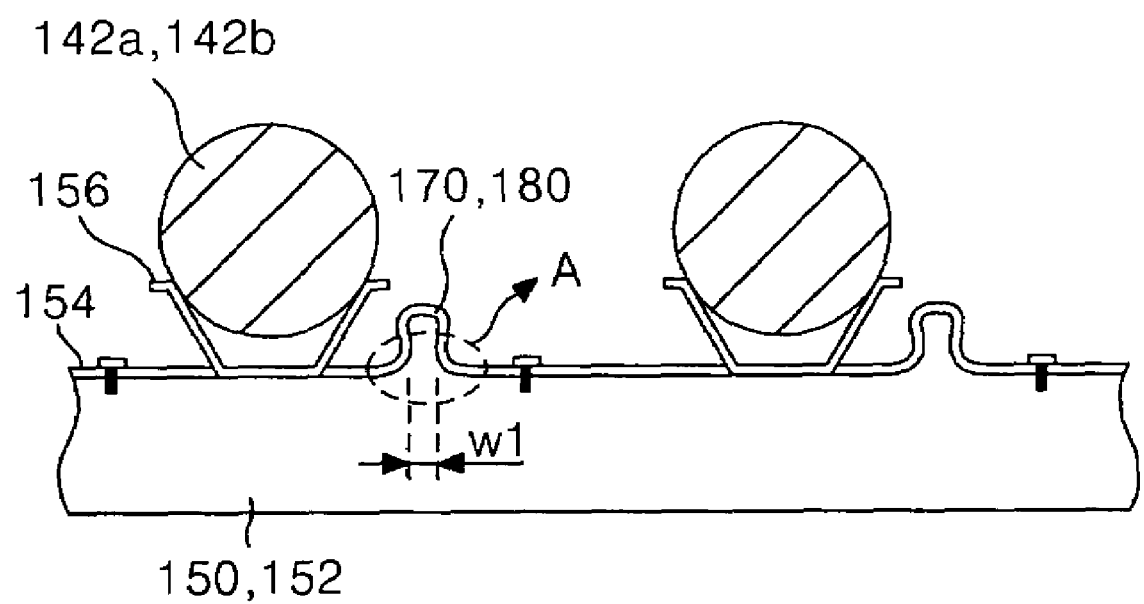
FIGS. 6A and 6B are diagrams explaining the buffing and absorbing of heat expansion of a bended part shown in FIG. 5.
Figure 6B:
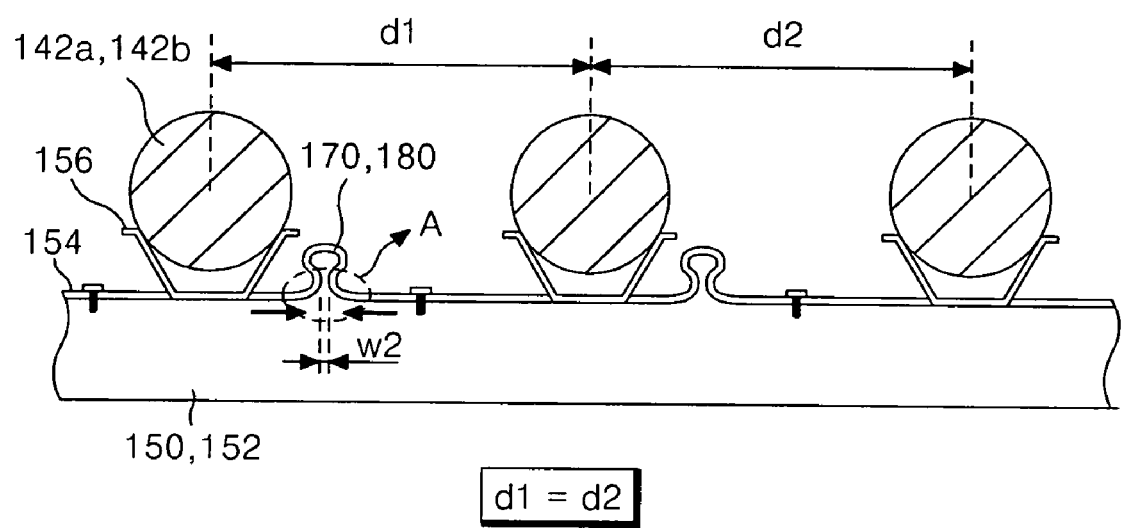

More specifically, the backlight unit using the external electrode fluorescent lamp 140 has the upper and lower conductive panels 154, 164 that expand due to the heat conducted to the external electrode fluorescent lamp 140 upon driving the backlight. The expansion by the heat of the conductive boards 154, 164 is transmitted to the bent parts 180, 170. In other words, as shown in FIG. 6A, two bent areas (A) of each of the bent parts 170, 180 before the backlight is driven maintain a designated distance W1 from each other. When the backlight is driven, as shown in FIG. 6B, the two bent areas (A) of the bent part 170, 180, to which the heat expansion is transmitted from the conductive boards 154, 160, compress to have a relatively narrower distance W2 than the distance W1 thereof before driving the backlight, thereby absorbing and relaxing the expansion of the conductive boards 154, 164. Accordingly, the distance between the lamps 140 is maintained (d1=d2). When the driving of the backlight is stopped, as shown in FIG. 6A, the distance between the bent areas (A) of the bent parts 170, 180 returns to the unexpanded distance. Thus, the distance between the lamps 140 remains uniform and no separation occurs from the supporter and cover by the conductive boards 154, 164, thereby permitting light to be incident uniformly on the liquid crystal display panel and improve the picture quality.

As described above, the backlight of the liquid crystal display device according to one embodiment of the present invention includes resilient upper and lower bent parts that are projected from the upper and lower conductive boards and located between the upper and the lower contact terminals. Accordingly, the bent part absorbs and relaxes the heat expansion of the conductive board, thereby preventing the backlight defect caused by the deformity of the conductive board, thus the picture quality of the liquid crystal display device is improved.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A backlight of a liquid crystal display device, comprising:
    a plurality of lamps, each lamp having an electrode;
    a plurality of contact terminals, each contact terminal in contact with one of the electrodes; and
    a conductive board electrically connecting the contact terminals, the conductive board having a continuous resilient bent part disposed therein, wherein the resilient part is disposed between adjacent contact terminals.

2. The backlight according to claim 1, wherein a width of the resilient part decreases with increasing heat from the lamps absorbed by the conductive board.

3. The backlight according to claim 1, wherein the lamp is an external electrode fluorescent lamp.

4. The backlight according to claim 1, wherein the bent part has symmetrical bent areas.

5. The backlight according to claim 4, wherein the bent part has a substantially rectangular shape when relaxed.

6. The backlight according to claim 4, wherein each symmetrical bent area has a substantially "S" shape when deformed.

7. The backlight according to claim 1, wherein the bent part comprises nickel coated on a surface of at least one of phosphor bronze and beryllium copper.

8. The backlight according to claim 1, further comprising a support that supports the conductive board.

9. The backlight according to claim 8, wherein the conductive board is attached to the support substantially midway between adjacent contact terminals.

10. The backlight according to claim 9, wherein the conductive board is attached to the support by a screw.

11. The backlight according to claim 8, wherein a center of the bent part is closer to one of the adjacent contact terminals than where the conductive board is attached to the support.

12. The backlight according to claim 8, wherein substantially all of the conductive board, except the bent part, contacts the support.

13. The backlight according to claim 1, wherein the continuous resilient bent part is projected from the conductive board.

14. A backlight of a liquid crystal display device, comprising:
- a plurality of lamps, each lamp having an electrode;
- a plurality of contact terminals, each contact terminal in contact with one of the electrodes; and
- a conductive board electrically connecting the contact terminals, the conductive board having a continuous resilient bent part disposed therein, wherein the conductive board has a plurality of resilient bent parts disposed therein, wherein at least one of the resilient parts is disposed between each pair of adjacent contact terminals.

15. A backlight of a liquid crystal display device, comprising:
- a plurality of lamps, each lamp having an electrode;
- a plurality of contact terminals, each contact terminal in contact with one of the electrodes; and
- a conductive board electrically connecting the contact terminals, the conductive board having a continuous resilient bent part disposed therein, wherein the conductive board has a plurality of resilient bent parts disposed therein, wherein at least one of the resilient parts is disposed between one of the contact terminals disposed most proximate to an end of the conductive board and the end of the conductive board.

16. A backlight of a liquid crystal display device, comprising:
- a plurality of lamps, each lamp having an electrode;
- a plurality of contact terminals, each contact terminal in contact with one of the electrodes;
- a conductive board electrically connecting the contact terminals, the conductive board having a continuous resilient bent part disposed therein, wherein the conductive board has a plurality of resilient bent parts disposed therein; and
- a support that supports the conductive board, the conductive board connected to the support at a plurality of attaching positions, wherein each of the resilient parts is closer to the contact terminal most proximate to the resilient part than the attaching position nearest to the contact terminal most proximate to the resilient part.

17. A backlight of a liquid crystal display device, comprising:
- a plurality of lamps, each lamp having an electrode;
- a plurality of contact terminals, each contact terminal in contact with one of the electrodes;
- a conductive board electrically connecting the contact terminals, which contact substantially all the electrodes of the plurality of lamps; and
- means for maintaining a distance between adjacent lamps with increasing heat from the lamps absorbed by the conductive board, wherein a width of the maintaining means decreases when heat from the lamps is absorbed by the conductive board.

18. The backlight according to claim 17, wherein the maintaining means is disposed between adjacent contact terminals containing the adjacent lamps.

19. The backlight according to claim 17, wherein the maintaining means is formed from a resilient conductive material.

20. The backlight according to claim 17, further comprising a support that supports the conductive board.

21. The backlight according to claim 20, wherein substantially all of the conductive board, except the maintaining means, contacts the support.

22. The backlight according to claim 21, wherein the maintaining means also is a means for preventing separation of the conductive board from the support.

23. The backlight according to claim 20, wherein the conductive board is attached to the support substantially midway between adjacent contact terminals.

24. The backlight according to claim 20, wherein a center of the maintaining means is closer to one of the adjacent contact terminals than where the conductive board is attached to the support.

25. The backlight according to claim 17, wherein the maintaining means is integrally formed with the conductive board.

26. The backlight according to claim 17, further comprising a plurality of maintaining means.

27. The backlight according to claim 26, wherein at least one of the maintaining means is disposed between each pair of adjacent contact terminals.

28. The backlight according to claim 26, wherein at least one of the maintaining means is disposed between one of the contact terminals most proximate to an end of the conductive board and the end of the conductive board.

29. The backlight according to claim 26, further comprising a support that supports the conductive board, the conductive board connected to the support at a plurality of attaching positions, wherein each of the maintaining means is closer to the contact terminal most proximate to the maintaining means than the attaching position nearest to the contact terminal most proximate to the maintaining means.

30. A method comprising:
- inserting a plurality of lamps into contact terminals electrically connected by a conductive board such that electrodes of the lamps contact the contact terminals;
- supplying power to the lamps to turn on the lamps and display an image on a screen of a portable display device;
- maintaining a distance between adjacent lamps independent of heat from the lamps absorbed by the conductive board by deforming a non-planar region of the conductive board when the conductive board expands due to the heat;
- incorporating a plurality of non-planar regions on the conductive board such that at least one of the non-planar regions is adjacent to each contact terminal; and
- attaching the conductive board to a support at a plurality of attaching positions selected such that each of the non-planar regions is closer to the contact terminal most proximate to the non-planar region than the attaching position nearest to the contact terminal most proximate to the non-planar region.

31. The method according to claim 30, further comprising inhibiting separation, at the contact electrodes, of the conductive board from a support to which the conductive board is attached using the non-planar region.

32. The method according to claim 31, further comprising inhibiting the separation without applying pressure to the lamps.

33. The method according to claim 31, further comprising inhibiting the separation without attaching the conductive board, between adjacent lamps, to the support at other positions other than about midway between the adjacent lamps.

34. A backlight of a liquid crystal display device, comprising:
 a plurality of lamps, each lamp having an electrode;
 a plurality of contact terminals, each contact terminal in contact with one of the electrodes; and a conductive board electrically connecting the contact terminals, the conductive board having a resilient bent part disposed therein, wherein the resilient bent part is substantially across the conductive board; and
 wherein the resilient part is disposed between adjacent contact terminals.

35. A backlight of a liquid crystal display device, comprising:
 a plurality of lamps, each lamp having an electrode;
 a plurality of contact terminals, each contact terminal in contact with one of the electrodes; and
 a conductive board electrically connecting the contact terminals, the conductive board having a resilient bent part disposed therein, wherein a distance between adjacent lamps is maintained independent of heat from the lamps absorbed by the conductive board by deforming the resilient bent part when the conductive board expands due to the heat.

* * * * *